(12) United States Patent
Lydick

(10) Patent No.: US 11,507,576 B2
(45) Date of Patent: Nov. 22, 2022

(54) METHOD AND SYSTEM TO EFFICIENTLY ANALYZE AND IMPROVE DATABASE QUERIES

(71) Applicant: T-Mobile USA, Inc., Bellevue, WA (US)

(72) Inventor: Christopher Lee Lydick, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/878,887

(22) Filed: May 20, 2020

(65) Prior Publication Data

US 2021/0365452 A1   Nov. 25, 2021

(51) Int. Cl.
*G06F 16/2453* (2019.01)
*G06F 16/2457* (2019.01)

(52) U.S. Cl.
CPC .. *G06F 16/24542* (2019.01); *G06F 16/24578* (2019.01)

(58) Field of Classification Search
CPC ............... G06F 16/24542; G06F 16/24578
See application file for complete search history.

(56) References Cited

U.S. PATENT DOCUMENTS

| | | | | |
|---|---|---|---|---|
| 9,183,254 B1* | 11/2015 | Cole | ............... | G06F 16/2282 |
| 9,244,971 B1* | 1/2016 | Kalki | ............... | G06F 16/24542 |
| 2007/0233671 A1* | 10/2007 | Oztekin | ............. | G06F 16/9535 |
| 2017/0329872 A1* | 11/2017 | Dispensa | .......... | G06F 16/24578 |
| 2020/0097481 A1* | 3/2020 | Cosentino | ............. | G06F 16/248 |
| 2020/0244762 A1* | 7/2020 | De Smet | ................. | G06F 9/542 |

* cited by examiner

*Primary Examiner* — Jay A Morrison
(74) *Attorney, Agent, or Firm* — Loeb & Loeb LLP

(57) ABSTRACT

A computer based agent may employ a variety of techniques including machine learning to analyze queries to a database, improve the queries to a database and make the improved queries available to new and old user through a user interface.

20 Claims, 9 Drawing Sheets

METHOD AND SYSTEM TO EFFICIENTLY ANALYZE AND IMPROVE DATABASE QUERIES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Large organizations collect a significant amount of data. The data can be analyzed to improve performance in the future and share insights and ideas across the business. Often times, the people that could use the analysis do not draft the database queries meaning the results of a database query may not be as useful as possible. In addition, other parts of the organization may also query the database and the desired results may be better or worse or just different than other parts of the organization depending on how the query is drafted and how the results are displayed. As a result, a significant amount of memory and processor time is wasted repeatedly running and modifying database queries and the desired data and analysis may still not be obtained. Furthermore, information silos are created, each of which claim to have the correct definition for any number of business insights or ideas originating from data.

SUMMARY

A computer based agent may employ a variety of techniques including machine learning to analyze queries to a database, logs, results, and other data, to improve the queries or architecture to a database and make the improved queries available to new and old users through a user interface. As a result of the system and method, less computing resources may be used as better queries may provide improved insights using less computing time and less computing resources.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

SPECIFICATION

Large organizations collect a significant amount of data. The data can be analyzed to improve performance in the future and share insights and ideas across the business. Often times, the people that could use the analysis do not draft the database queries meaning the results of a database query may not be as useful as possible. In addition, other parts of the organization may also query the database and the desired results may be better or worse or just different than other parts of the organization depending on how the query is drafted and how the results are displayed. As a result, a significant amount of memory and processor time is wasted repeatedly running and modifying database queries and the desired data and analysis may still not be obtained. Furthermore, information silos are created, each of which claim to have the correct definition for any number of business insights or ideas originating from data.

Figure 1:
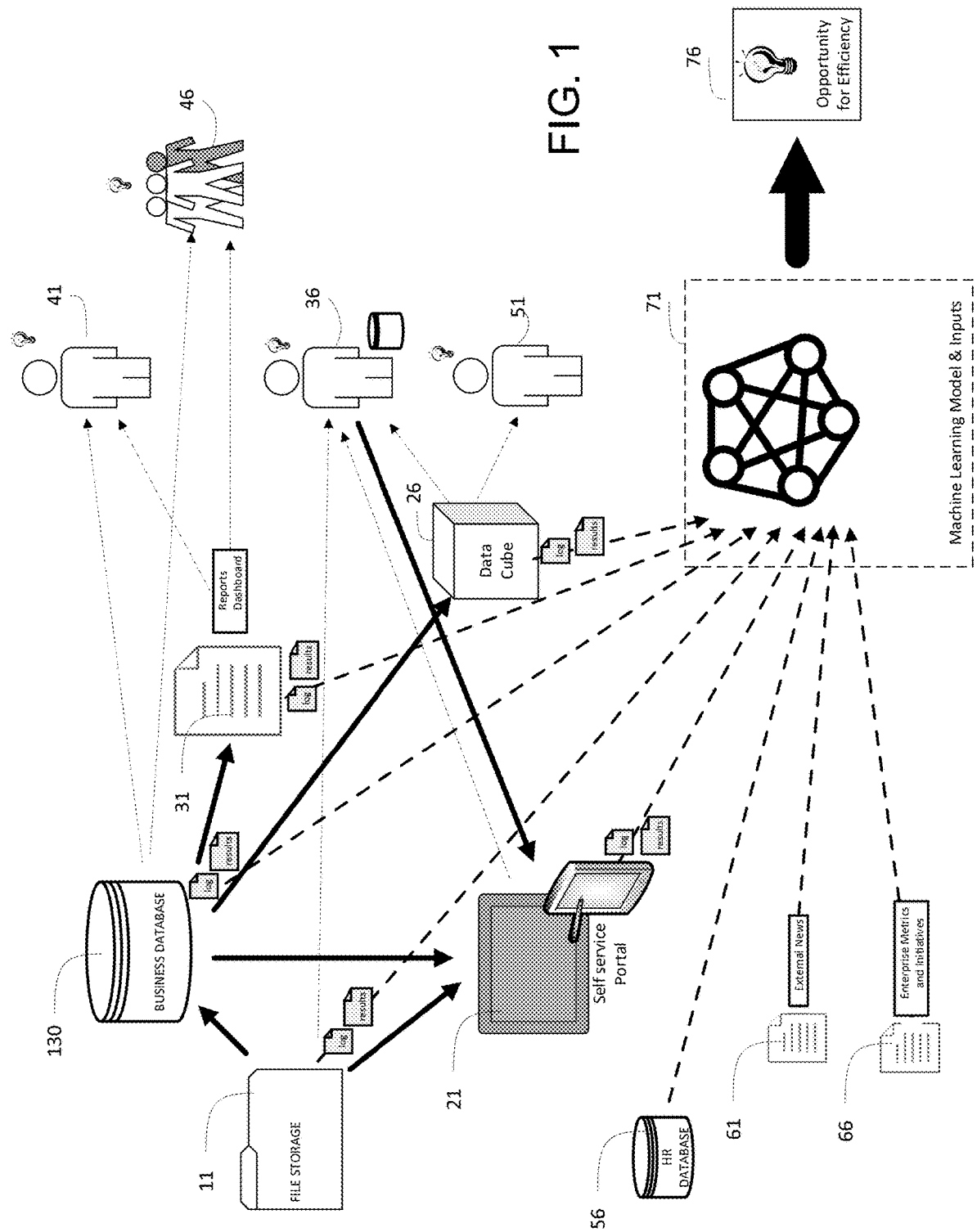
FIG. 1 may be an illustration of an organization and database users.

Referring to FIG. 1, a sample large organization may be a communication company. A business database 130 may be a single database or a plurality of databases 131, 132, 135 (FIG. 2) and it may collect and distribute data about the organization. The data may be distributed by the dark arrows from file storage 11, or from database 130 or to self service portals 21 (user created dashboard, user scheduled alerts, custom calculations, user enriched data), to a data cube 26 (what the centralized data may be, filters user have applied, how new/changed data is consumed, dates/time of data pulls from the customer), and to reports dashboard 31 (consumption, date, time, location [IP address], type of person that requested the data [VP, analyst], domain, initiative which created the report). Data scientist or database administrator 36 may also contribute data to the self service portal 21 and file storage 11 may contribute data to the self service portal 21.

Results of queries may be indicated by dashed lines. Data results from the business database 130 may flow to an analyst 41, and to teams that share a common login 46. Report and dashboard 31 may also be provided to analysts 41 and teams 46. File storage 11 results may be provided data scientists 36 as well as data from the self service portal 21. The data cube 26 may also feed data to the data scientist 36 as well as a business executive 51. All users have ideas on insights and useful information which is hard to retrieve and consolidate without consuming significant time from those users.

The machine learning module 71 may act like an agent 141 (FIG. 3) that collects data (indicated by the dotted lines) from a variety of source and tries to learn from it to show possible network optimizations or improved results and insights 76 to users in an easy to use fashion. The machine learning module 71 may collect usage, architecture, results, or data from the data cube 26, the reports dashboard 31, the business database 130, the file storage 11, the self-service portal 21, the HR database 56, the external news 61 and enterprise metrics and initiatives 66 to learn from the data and create better results or network optimizations in the future. Those results from 71 can be weighted and prioritized based upon the user, the timestamp the query, and the precise results generated from the query. As just an example, a query against a plurality of regional database by someone looking for national data may be improved to use a single national database that covers the entire nation. By using machine learning to review past data and results from a variety of sources, better results 76 and better queries 76 and better network designs may occur in the future. Another example, by combining data existing in database 130 with data from data scientist 36 in self service portal 21, new insights or information can be observed through logs, usage & results. Furthermore, new data can be identified as valuable which was otherwise unknown.

Figure 2A:
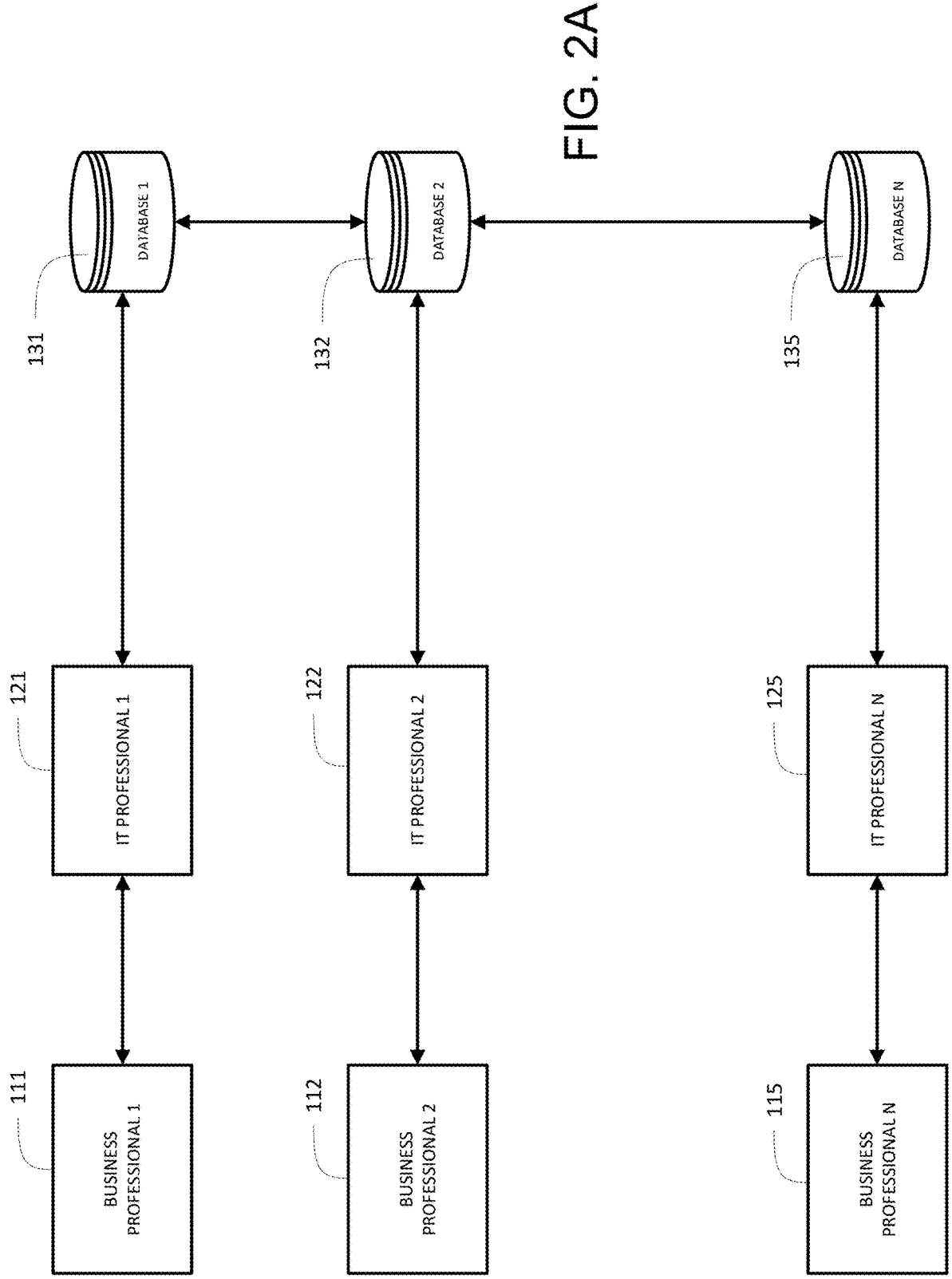
FIG. 2A may be an illustration of a standard database arrangement.

Referring to FIG. 2A, in a more focused illustration, data on dropped calls, network usage, signal strength, data type, delays, antenna usage, network problems, revenue, revenue source, etc., all may be available in various databases 131, 132, 135 but the data alone may be overwhelming. Business leaders 111, 112, 115 often need the analysis of the data and do not have the skills to query the database to get the proper data which then needs to be analyzed. The business leaders 111, 112, 115 may request an IT professional 121, 122, 125 to draft the appropriate queries of the database to find the desired data and to analyze the data. Immediately, a potential issue may exist in the translation from the business desires to the queries of the database as the results of the query may not capture the desired data or may capture too much data, either of which may result in a flawed analysis. The queries may have to be repeated and refined which may require excessive processor cycles, memory usage and lost productivity.

In addition, there may be several databases 131, 132, 135 which may have the desired information. Data is often duplicated across databases and the data in one database 131 may be different from data in a second database 132. The same query executed against a first database 131 may return different results when executed against a second database 132. As a result, any analysis on the results from the first database 131 may likely be different from the results from the second database 132. The queries may have to be repeated and refined which may require excessive processor cycles, memory usage and lost productivity.

Similarly, the query executed by a first IT professional 121 may be different from a query executed by a second IT professional 122. While the analysis requested by a first business person 111 may be similar to the request of a second business person 112, the results from the database and analysis may vary depending on how the search was structured. The poorly structured queries may miss capturing the desired data which may lead to poor decisions. The queries may have to be repeated and refined which may require excessive processor cycles, memory usage and lost productivity.

Some business people or IT professionals may not know some data is even available. The large amount of data may be so great that a first IT professional 121 may only know part of what is available and a second IT professional 122 may only know about a separate data warehouse.

Finally, the same query may be executed time and time again by separate IT professionals 121, 122, 125. The repeated queries may cause unnecessary processor usage, unnecessary memory usage and excessive bandwidth usage.

Figure 2B:
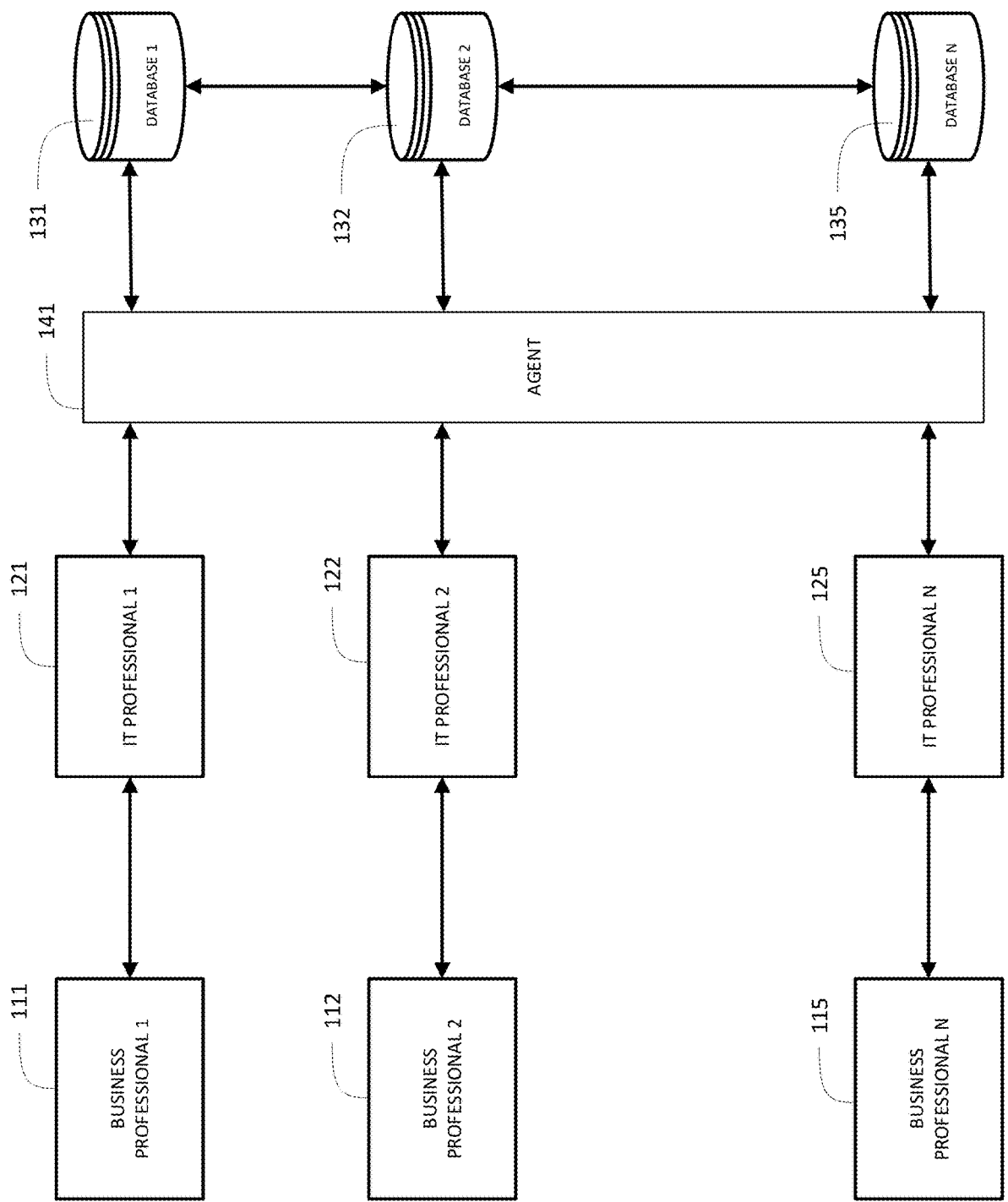
FIG. 2B may be an illustration of a database agent monitoring database traffic.

Referring to FIG. 2B, an agent 141 may be created to store and analyze the queries being executed against one or more databases 131, 132, 135 and the results of the queries. In some embodiments, the agent 141 may be a specifically designed piece of hardware. The agent 141 hardware may be designed to have high speed communication components and fast memory such that the access in and out of the database 131, 132, 135 will not be affected.

In other embodiments, the agent may be a software application that physically configures a processor in a device to execute the blocks of the method. As is known, a processor has logic gates that are physically changed based on the computer executable instructions. Each set of computer executable instructions in a software application results in the processor having a different physical configuration.

Figure 3:
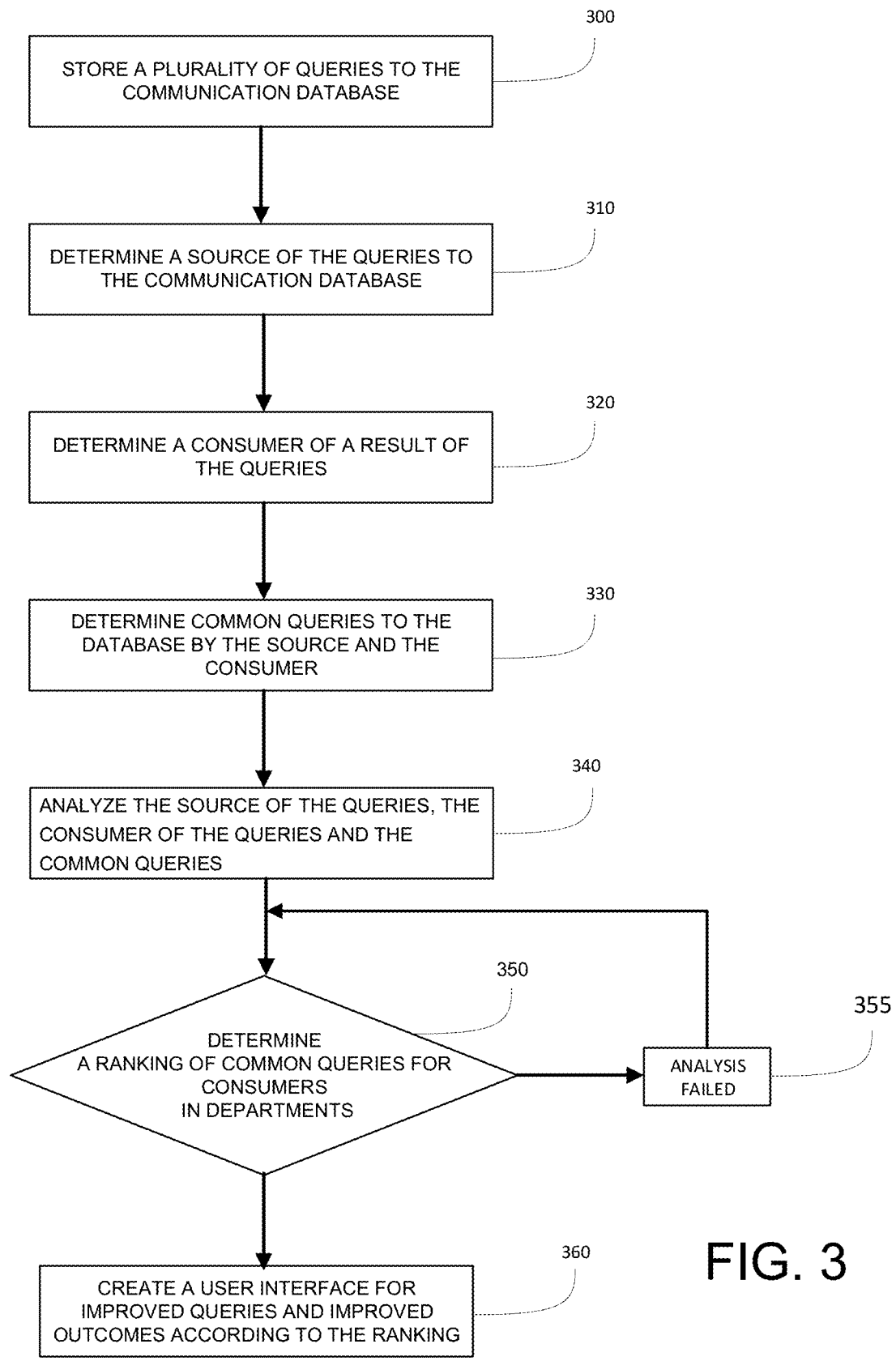
FIG. 3 may be an illustration of a method of analyzing and improving database queries.

The analysis may take on many forms and may look for different elements. FIG. 3 may illustrate one embodiment of the analysis. At block 300, the agent 141 may store the queries to a communication database 131, 132, 135 and the results and analyze them. The agent 141 may copy the queries, results, and architectural changes to memory for analysis. In some embodiments, the queries may be analyzed in real time. In other embodiments, the queries may be analyzed periodically or when a threshold number of queries is reached.

At block 310, a source of the queries to the communication database may be determined. The source may be determined from an IP address, account name/username, or other available information to determine who issued the query. The analysis may review the IP addresses, username, or other available information for users of the system such as an organization chart and may match the account name/username of the query source to the username on the organizational chart. In other embodiments, other identification data may be used to determine the source of the query. For example, in some embodiments, a user may require permission to access a database and the permission request may include a name and password which may be used to identify the source. In yet another embodiment, other network data such as a MAC address or IP address of a computer making the request may be used to identify the source of the request.

At block 320, a consumer of a result of the queries may be determined. In the previous example, a consumer may be a decision maker such as a business person as opposed to the query drafter who may be an IT professional. The consumer may be determined by tracking the use of the result of the query. In one embodiment, a cookie or small file used for identification may be placed in the results such that the consumer may be determined. In other embodiments, the results may pull data from the communication database and the IP address or MAC address of the computer accessing the data to fill in the report may be used to identify the consumer of the report. In addition, the consumer of the report may use login credentials and the login credential may be used to verify the consumer has permission to view the report, as well as access to the other reports this user has. The login credentials also may be used to determine the consumer of the report.

At block 330, common queries to the database may be determined by the source and the consumer. By determining common queries, these queries may be studied more in depth and more effort may be made to understand these queries and how to improve these queries and make the improved queries more available to more consumers.

In one embodiment, the query terms in the plurality of searches may be compared and searches with the same or similar terms may be counted as being similar queries. For example, a first query may look for dropped calls and a second query may look for cut off calls. To some result consumers, dropped calls and cut off calls may both be of interest and these queries may be considered the as the same query.

In another example, a query against a first database 121 or data silo may be the same as a query executed against a second database 122. These two queries may be considered the same and may be studied more closely.

The source and consumer of the queries also may matter in determining the common queries. For example, there may be a first list for similar queries for sources and a separate list of common queries for consumers and the two lists may be different. By analyzing the similarities separately, different results may be possible.

At block 340, the source of the queries, the consumer of the queries and the common queries may be analyzed. The analysis may have the goal of address the technical problems discussed previously such as searching the wrong database, repeatedly searching the same database for different professionals, relying on poorly drafted database queries, etc.

Figure 4:
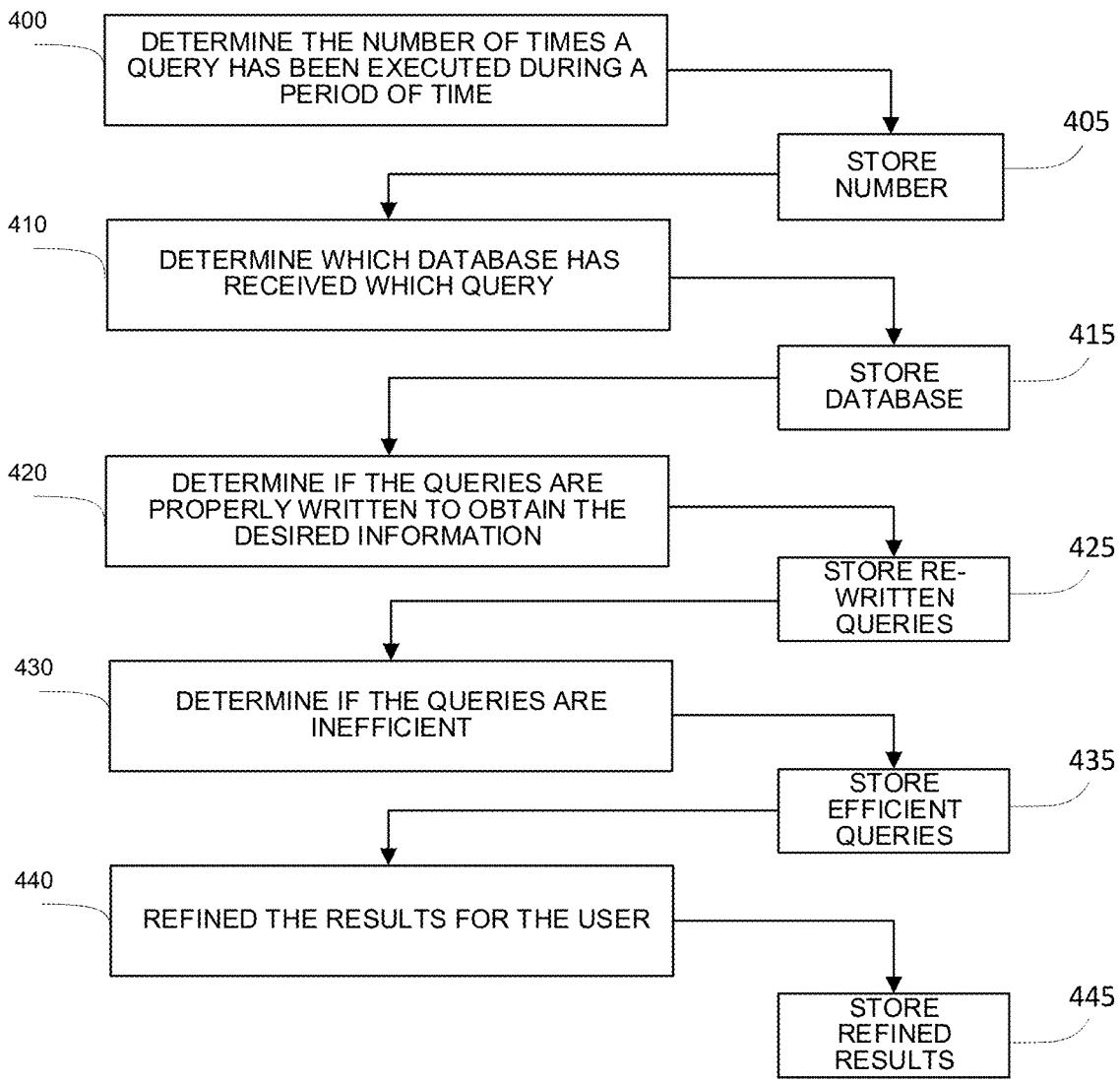
FIG. 4 may be a method of improving queries.

Referring to FIG. 4, blocks representing computer executable instructions for analysis may be illustrated. At block 400, the number of times a query has been executed during a period of time may be determined. If a query is used often, additional analysis of the query and its use may be worthwhile. As mentioned previous, semantic analysis may be used to group together searches which may not use the exact terms but are functionally equivalent.

At block 405, the number of times a query was executed during a period of time as determined in block 400 may be stored in a memory.

At block 410, the system and method may determine which database has received which query. Many databases may be available. Some databases may be more up to date than other databases. Similarly, some databases may cover a specific geographic area while another database may cover a different geographic area. Further, some databases may be from a legacy company and another database may be from a separately purchased company. An authority may create a ranking of the various databases and may compare the various queries to the available databases to create a ranking of appropriate databases for various queries. The databased used may be compared to the ranking and a determination may be made if the higher ranked database being used.

Figure 5:
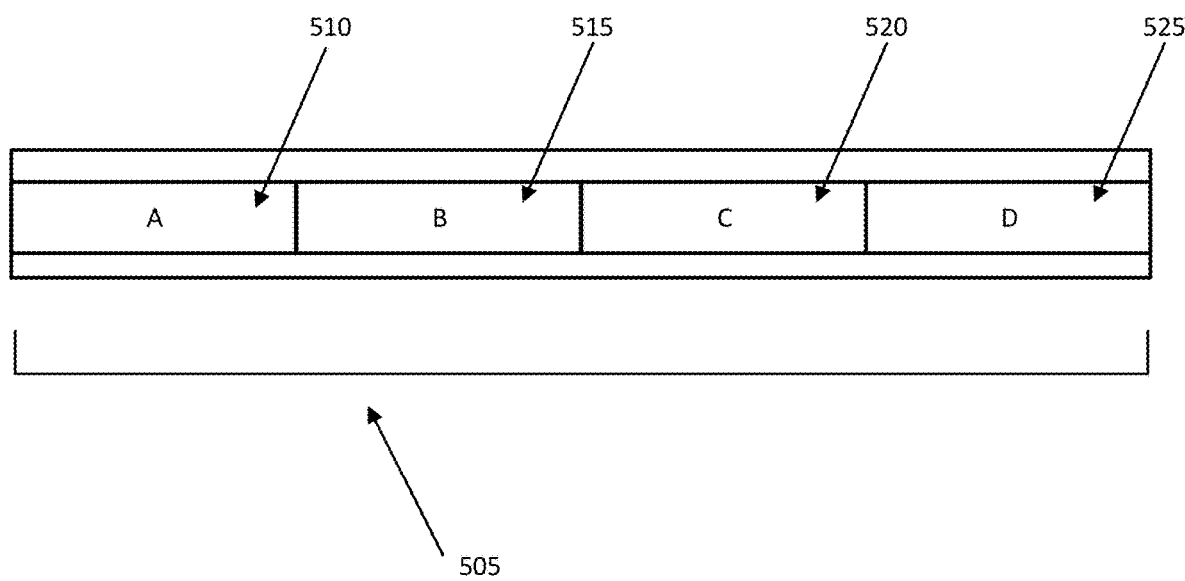
FIG. 5 may be a training set in a machine learning environment.
Figure 6A:
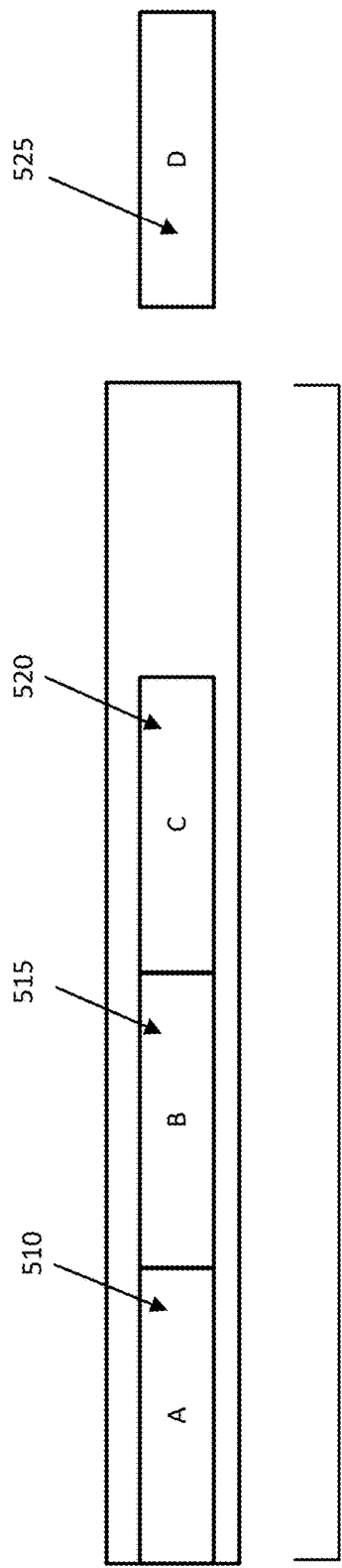
FIG. 6A may illustrate rotating training sets in a machine learning environment.
Figure 6B:
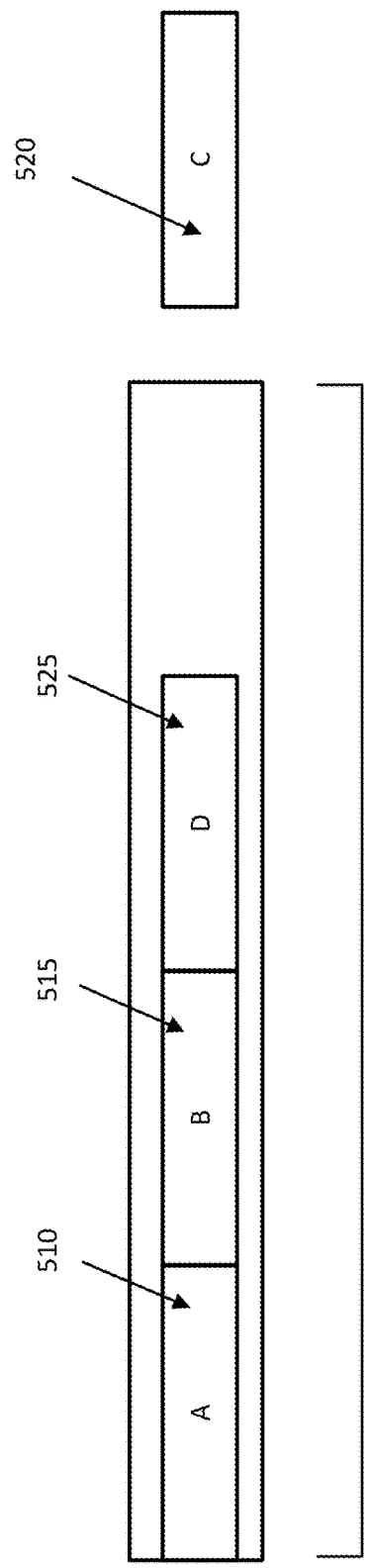
FIG. 6B may illustrate rotating training sets in a machine learning environment FIG. 7 may illustrate a sample user interface which presents the improved queries to users.

In other embodiments, machine learning may be used to determine the best database for each query. The machine learning may examine past queries and past results and determine which database may be considered the best database for each search. Machine learning may be used to analyze past results in view of the actual results, so that the determination of a proper database becomes more accurate. Machine learning may be used to review a training group of past results and determine improved results moving forward. FIG. 5 may illustrate sample artificial intelligence (AI) training data according to one or more embodiments. As an example and not a limitation, an artificial intelligence system may be trained by analyzing a set of training data 505. The training data may be broken into sets, such as set A 510, set B 515, set C 520 and set D 525. As illustrated in FIG. 6A, one set may be used as a testing data set (e.g., set D 525) and the remaining sets may be used as a training data set (e.g., set A 510, set B 515 and set C 520). The artificial intelligence system may analyze the training data set (e.g., set A 510, set B 515 and set C 520) and use the testing set (e.g., set D 525) to test the model created from the training data. The data sets may shift as illustrated in FIG. 6B, where the testing data set may be added to the training data sets (e.g., set A 510, set B 515 and set D 525) and one of the training data sets that has not been used to test before (e.g., set C 520) may be used as the testing data set. The analysis of the new training data (e.g., set A 510, set B 515 and set D 525) may occur again with the new testing set (e.g., set C 520) being used to test the model and the model may be refined. The rotation of data sets may occur repeatedly until all the datasets have been used as the test data set. The model then may be considered complete and the model may then be used on additional data sets.

At block 415 the databases for each search may be updated according to guidelines, standard, examples or an algorithm with the determined database.

At block 420, the queries may be analyzed to determine if the queries are properly written to obtain the desired information. While many IT professionals are skilled, some IT queries may not be formatted to obtain the desired data. For example, a geographical limitation may be part of a query and that geographical limitation may be different than expected. Similarly, some queries may result in too much data. The queries may be analyzed to optimize the results of the query.

At block 425, the queries may be re-written according to guidelines, standard, examples or an algorithm to make the queries better at obtaining the desired information. As mentioned in regard to FIGS. 5, 6A and 6B, machine learning may be also used to re-write the queries. The re-written queries may be stored in a memory for future use.

At block 430, the queries may be reviewed to determine if the queries are inefficient. Like many parts of computer science, some queries are more efficient than others. The system and method may review the query and determine is a more efficient query is possible. For example, a query may be executed against multiple databases and the results may be joined to create a result where a single query may be executed against a single database to obtain the same results.

At block 435, more efficient queries may be created according to guidelines, standard, examples or an algorithm and stored in a memory for future use. As mentioned in regard to FIGS. 5, 6A and 6B, machine learning may be also be used to re-write the queries. The re-written queries may be stored in a memory for future use.

Further, the machine learning of FIGS. 5 and 6A, 6B may be used to propose new insights into the physical structure or architecture of the network. Oftentimes, networks are a patchwork of pre-existing networks which may have been melded together through corporate mergers and consolidations. Thus, networks may be operational but may be less than optimal. The machine learning may be able to review parts of the network that work well and part of the network that seem to be slow or even unresponsive. By adjusting the network physical characteristics, better performance from the network may be possible. For example, the machine learning may determine that databases closer to higher capacity communication lines may be more efficient. Thus, if possible, databases may be moved to locations with higher capacity communication lines. Logically, the machine learning may be able to identify other aspects of the system that may work better than others and the machine learning may suggest that the system by physically reconfigured.

At block 440, the results of the analysis may be refined for the user. The user may be determined by attaching a cookie to the report or monitoring the IP address opening the report and determining the user based on the IP address. If the consumer queries are being analyzed, the number of minor changes to a query may indicate the initial results were not as expected and had to be tweaked or changed. If the source is repeatedly re-formatting queries or changing databases, the analysis may be different.

For each source, an improved outcome may be determined for the consumer of the queries or for the source. The improvement may be based on an analysis of the queries to the databases, the timing of the queries and how the queries are modified during the time period.

At block 350, a ranking of common queries for consumers in departments may be determined. Departments may be determined from an organizational chart, from the IP addressed and/or account name/username of the users in the organizational chart. By determining what searches came from which department, the various searches may be made available in each department based on popularity in an easier way. The popularity may be based on the frequency of use or on the rate of increase of use or any other metric that an authority deems appropriate. In some embodiments, the ranking may be personal.

Further, the machine learning of FIGS. 5 and 6A, 6B may be used to propose new insights to other parts of the business. For example, one part of the business may determine a query is very accurate at predicting future cell usage. Other parts of the business may not even think of such a query or may use a less accurate query. By analyzing the queries used, the frequency of use or user feedback, the ranking of queries may be affected. As an example, a manager of the eastern region may be presented with a query used frequently by the western region and vice versa as the machine learning may determine a particular query is especially effective.

It should be noted that the improved queries from block 300-345 may be used to populate the common queries. The ranking of the unimproved queries may be used to rank the improved queries. By using the improved queries, mistakes from the past will not be carried forward into the future and better results may be available to users and consumers. If the analysis failed, control may pass to block 355 where the failure may be stored and addresses and control may return to block 350 for the method to try again. If the analysis in block 350 was successful, control may pass to block 360.

Figure 7:
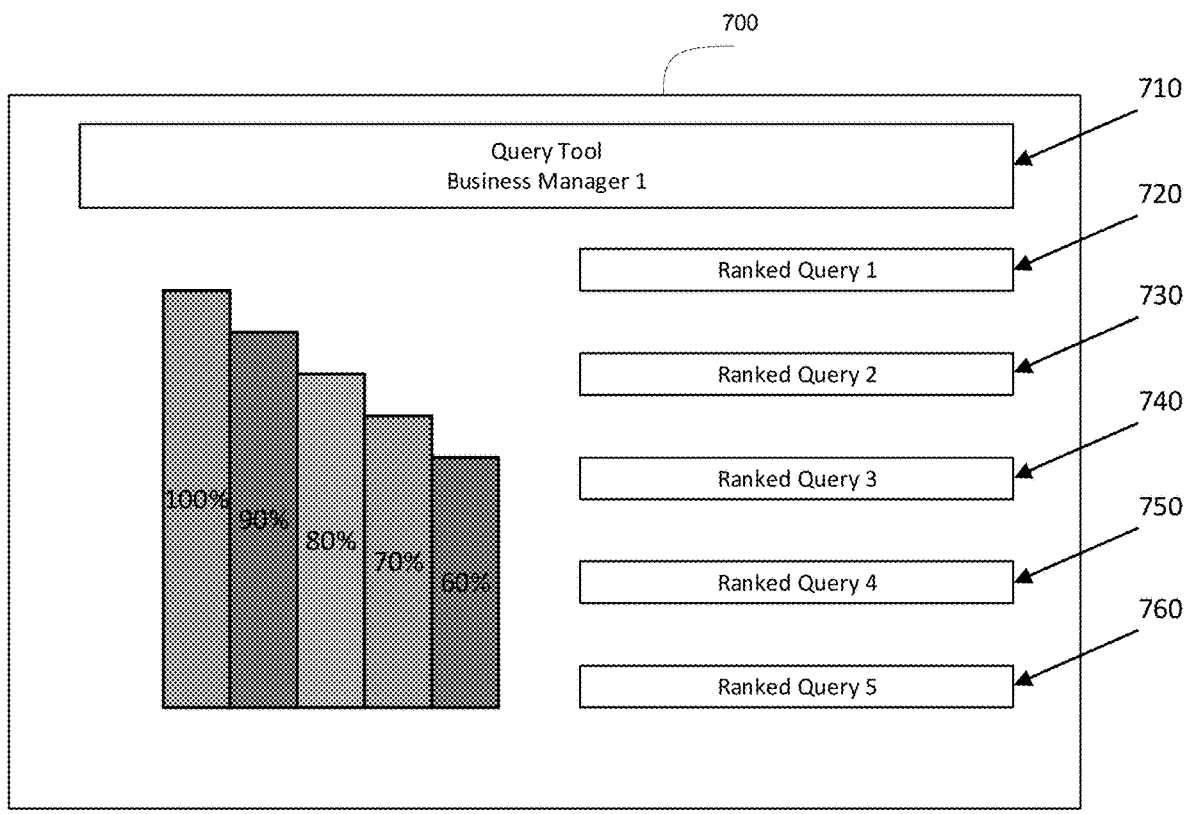

At block 360, a user interface such as in FIG. 7 may be created. The user interface may allow business users to select queries and obtain results without having to involve a database programmer or understand how to create a database query. In addition, queries that may be used by one consumer may be made available for other consumers. The order of the queries may be changed by the user, by an authority or by an algorithm. For example, in FIG. 7 a user interface 700 may be presented. The user interface 700 may be created for a department or a single user 710 such as a vice president. The first ranked query may be easily accessible by a single selection 710 and the lesser ranked queries 720-760 may also be available without the user having to know anything about how to create a database query.

In some embodiments, the queries are run when requested. In other embodiments, the queries are run in anticipation of a consumer requesting the results. For example, a user may review dropped call statistics every morning at 6 am. The system and method may learn that the query executes routinely at 6 am and the system and method may run the query at 5:45 in order to have the results ready at 6 am.

Figure 8:
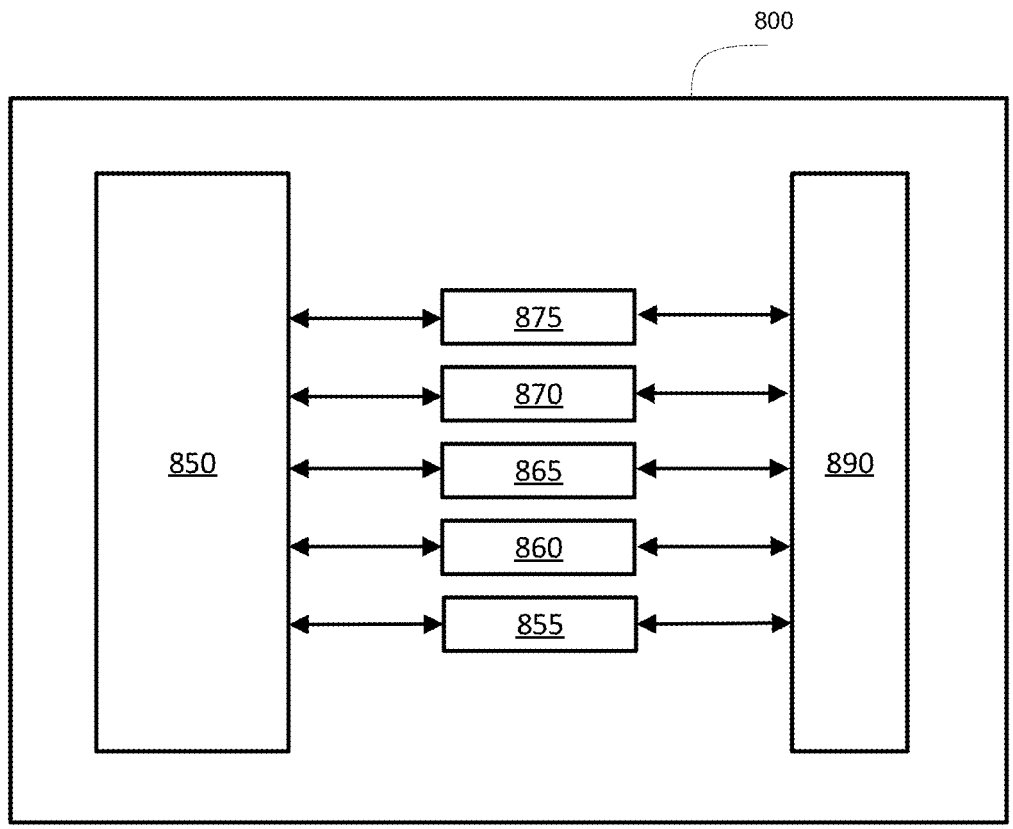
FIG. 8 may be an illustration of elements of a computer that may be used.

FIG. 8 may be an example electronic device 800 that is part of the system. The electronic device 800 may be physically configured to interact or communicate with other electronic devices via a communication network, such as a Wi-Fi network or a cellular network, for example, cellular network. The electronic device 800 may have a processor 850 that is physically configured according to computer executable instructions as the logic gate may be physically altered according to the computer executable instructions. The electronic device 800 may have a power supply 855 such as a battery, which may be rechargeable. The electronic device 800 may also have a sound and video module 860 which assists in displaying video and sound and may turn off when not in use to conserve power and battery life. The electronic device 800 may also have volatile memory 865 and non-volatile memory 870 as well as internal storage 875 or external storage. The electronic device 800 may have an input/output bus 890 that shuttles data to and from various user input devices such as a keyboard, mouse, speakers, or other inputs. It also may control communicating with other electronic devices and system components, either through wireless or wired devices. Of course, this is just one embodiment of the electronic device 800 and the number and types of electronic devices 800 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The electronic devices, computing devices, sensors, computers, routers, and/or servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The electronic devices, computers, sensors, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C+, C++, Python, Perl, or Assemble using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

The invention claimed is:

1. A communication database analysis system comprising a processor physically configured according to computer executable instructions, a memory to store computer executable instructions, and an input output circuit, the computer executable instructions comprising instructions for:
    storing in the memory a plurality of queries to the communication database;
    determining a source of the queries to the communication database;
    determining a consumer of a result of the queries;
    determining common queries to the database by the source and the consumer;
    analyzing the source of the queries, the consumer of the queries, the timing of the queries, how the queries are modified during a time period, and the common queries;
    determining an improved outcome for the consumer of the queries as a function of the analyzing, wherein determining further comprising at least one of the following: attaching a cookie associated with a user as a function of the analyzing, monitoring an internet protocol (IP) address associated with the user, monitoring a number of changes to the plurality of queries, a number of reformatting of queries, and a number of changes to databases;
    in response to the improved outcome, determining improved queries for the source;
    creating a ranking of common queries for consumers in departments; and
    creating a user interface for improved queries and improved outcomes according to the ranking.

2. The system of claim 1, wherein the source is determined from an ip address or username.

3. The system of claim 2, wherein the consumer is determined from an ip address or username.

4. The system of claim 3, further comprising determining departments by matching ip addresses for sources and consumer to an organizational chart of ip addresses or usernames.

5. The system of claim 4, further comprising computer executable instructions for providing improved results to additional departments.

6. The system of claim 1, further comprising computer executable instructions for:
    analyzing database queries for inefficiency;
    creating revised database queries wherein revised database queries are more efficient;
    storing the revised database queries in a memory for future use; and
    making the revised queries available via a user interface.

7. The system of claim 1, further comprising computer executable instructions for:
    analyzing database queries for using an improper database;
    creating revised database queries wherein revised database queries use the proper database;
    storing the revised database queries in a memory for future use; and
    making the revised queries available via a user interface.

8. The system of claim 1, further comprising computer executable instruction for:
    determining whether network architecture is operating efficiently;
    creating a revised network architecture to be more efficient; and
    informing an administrator of the revised network architecture.

9. A method to analyze and improve database query results comprising:
    storing in a memory a plurality of queries to a database;
    determining a source of the queries to the database;
    determining a consumer of a result of the queries;
    determining common queries to the database by the source and the consumer;
    analyzing the source of the queries, the consumer of the queries, the timing of the queries, how the queries are modified during a time period, and the common queries, the query itself, and the results of that query;
    determining an improved outcome for the consumer of the queries as a function of the analyzing, wherein determining further comprising at least one of the following: attaching a cookie associated with a user as a function of the analyzing, monitoring an internet protocol (IP) address associated with the user, monitoring a number of changes to the plurality of queries, a number of reformatting of queries, and a number of changes to databases;
    in response to the improved outcome, determining improved queries for the source;
    creating a ranking of common queries for consumers in departments; and
    creating a user interface for improved queries and improved outcomes according to the ranking.

10. The method of claim 9, wherein the source is determined from an ip address or account name/username.

11. The method of claim 10, wherein the consumer is determined from an ip address or account name/username.

12. The method of claim 11, further comprising determining departments by matching ip addresses or account names/usernames for sources and consumer to an organizational chart of ip addresses or account names/usernames.

13. The method of claim 12, further comprising computer executable instructions for providing improved results to additional departments.

14. The method of claim 9, further comprising:
analyzing database queries for inefficiency;
creating revised database queries or data architectural changes wherein revised database queries or data architectural changes are more efficient;
storing the revised database queries in a memory for future use; and
making the revised queries available via a user interface.

15. The method of claim 9, further comprising:
analyzing database queries for using an improper database;
creating revised database queries wherein revised database queries use the proper database;
storing the revised database queries in a memory for future use; and
making the revised queries available via a user interface or providing/promoting queries and results which may be useful but otherwise unknown to a user.

16. The method of claim 9, further comprising:
determining whether database queries are properly written;
creating revised database queries wherein revised database queries are properly written;
storing the revised database queries in a memory for future use; and
making the revised queries available via a user interface.

17. A non-transitory computer readable medium comprising computer executable instructions for:
storing in a memory a plurality of queries to a database;
determining a source of the queries to the database;
determining a consumer of a result of the queries;
determining common queries to the database by the source and the consumer;
analyzing the source of the queries, the consumer of the queries, the timing of the queries, how the queries are modified during a time period, and the common queries;
determining an improved outcome for the consumer of the queries as a function of the analyzing, wherein determining further comprising at least one of the following: attaching a cookie associated with a user as a function of the analyzing, monitoring an internet protocol (IP) address associated with the user, monitoring a number of changes to the plurality of queries, a number of reformatting of queries, and a number of changes to databases;
in response to the improved outcome, determining improved queries for the source;
creating a ranking of common queries for consumers in departments; and
creating a user interface for improved queries and improved outcomes according to the ranking.

18. The non-transitory computer readable medium of claim 17, wherein the source or consumer is determined from an ip address or account name/username.

19. The non-transitory computer readable medium of claim 18, further comprising determining departments by matching ip addresses or account names/usernames for sources and consumer to an organizational chart of ip addresses or account names/usernames.

20. The non-transitory computer readable medium of claim 19, further comprising computer executable instructions for providing improved results to additional departments.

* * * * *